United States Patent
Tamaoki (10) Patent No.: US 12,136,231 B2
(45) Date of Patent: Nov. 5, 2024

(54) RECOGNITION PROCESSING SYSTEM, RECOGNITION PROCESSING DEVICE, AND RECOGNITION PROCESSING METHOD

(71) Applicant: Sony Semiconductor Solutions Corporation, Kanagawa (JP)

(72) Inventor: Akihiro Tamaoki, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 132 days.

(21) Appl. No.: 17/910,774

(22) PCT Filed: Feb. 10, 2021

(86) PCT No.: PCT/JP2021/005041
§ 371 (c)(1),
(2) Date: Sep. 9, 2022

(87) PCT Pub. No.: WO2021/186960
PCT Pub. Date: Sep. 23, 2021

(65) Prior Publication Data
US 2023/0113547 A1  Apr. 13, 2023

(30) Foreign Application Priority Data

Mar. 16, 2020 (JP) .................................. 2020-045764

(51) Int. Cl.
*G01S 13/86* (2006.01)
*G06T 7/70* (2017.01)
*G06V 10/764* (2022.01)

(52) U.S. Cl.
CPC .............. *G06T 7/70* (2017.01); *G01S 13/867* (2013.01); *G06V 10/764* (2022.01); *G06T 2207/10028* (2013.01); *G06T 2207/30252* (2013.01)

(58) Field of Classification Search
CPC ............. G06T 7/70; G06T 2207/10028; G06T 2207/30252; G01S 13/867; G01S 7/417;
(Continued)

(56) References Cited

U.S. PATENT DOCUMENTS 10,228,457 B2 * 3/2019 Kai ....................... G01S 13/867
11,150,326 B2 * 10/2021 Yu .............................. G01S 7/40
(Continued)

FOREIGN PATENT DOCUMENTS

| JP | 2001-099930 A | 4/2001 |
| JP | 2004-191131 A | 7/2004 |

(Continued)

OTHER PUBLICATIONS

English Translation of JP-2011027457-A (Year: 2009).*
(Continued)

*Primary Examiner* — John R Schnurr
(74) *Attorney, Agent, or Firm* — Wolf, Greenfield & Sacks, P.C.

(57) ABSTRACT

To perform high-speed recognition processing of an image signal acquired by imaging.

A recognition processing system of the present disclosure includes: a first sensor device that acquires an image signal by imaging; a second sensor device that performs an object detection process, a selection unit that selects one of a plurality of recognition processes based on information on the object detected by the detection process; and a recognition processing unit that executes the recognition process selected by the selection unit based on the image signal.

14 Claims, 7 Drawing Sheets

(58) Field of Classification Search
CPC ...... G01S 7/4802; G01S 15/931; G01S 17/86; G01S 17/931; G01S 2013/9323; G01S 2013/9324; G01S 7/411; G01S 7/415; G01S 13/42; G01S 2013/93271; G01S 13/931; G01S 13/66; G06V 10/764; H04N 7/181
See application file for complete search history.

(56) References Cited

U.S. PATENT DOCUMENTS

| | | | |
|---|---|---|---|
| 2004/0246167 A1* | 12/2004 | Kumon | G01S 13/867 342/107 |
| 2020/0174115 A1* | 6/2020 | Prados | G01S 13/931 |
| 2023/0011475 A1* | 1/2023 | Mori | G01S 13/865 |

FOREIGN PATENT DOCUMENTS

| | | | | |
|---|---|---|---|---|
| JP | 2008002817 A | * | 1/2008 | |
| JP | 2011027457 A | * | 2/2011 | |
| JP | 2012220377 A | * | 11/2012 | G06K 9/6227 |

OTHER PUBLICATIONS

PCT/JP2021/005041, Apr. 6, 2021, International Search Report.
International Search Report and English translation thereof mailed Apr. 6, 2021 in connection with International Application No. PCT/JP2021/005041.

* cited by examiner

RECOGNITION PROCESSING SYSTEM, RECOGNITION PROCESSING DEVICE, AND RECOGNITION PROCESSING METHOD

CROSS-REFERENCE TO RELATED APPLICATIONS

This application claims the benefit under 35 U.S.C. § 371 as a U.S. National Stage Entry of International Application No. PCT/JP2021/005041, filed in the Japanese Patent Office as a Receiving Office on Feb. 10, 2021, which claims priority to Japanese Patent Application Number JP2020-045764, filed in the Japanese Patent Office on Mar. 16, 2020, each of which is hereby incorporated by reference in its entirety.

TECHNICAL FIELD

The present disclosure relates to a recognition processing system, a recognition processing device, and a recognition processing method.

BACKGROUND ART

There is a method of preprocessing an image captured by a camera and feeding back the result of performing an object recognition process on the preprocessed image to the preprocessing. There is a demand to apply this method to the automated driving of vehicles to support the automated driving. However, in this method, the amount of calculation of a recognizer is large and the power consumption is also high. Therefore, it is difficult to realize this method in a small-scale system that can be mounted on a vehicle. In addition, this method has a problem that the frame delay becomes large and the latency becomes large.

PTL 1 below describes object recognition using a camera and a millimeter-wave radar. However, there is no description about a method of reducing the calculation amount of the recognition processing of the camera or a method of accelerating the calculation process.

CITATION LIST

Patent Literature

[PTL 1]
JP 2001-99930 A

SUMMARY

Technical Problem

The present disclosure provides a recognition processing system, a recognition processing device, and a recognition processing method for performing high-speed recognition processing of an image signal acquired by imaging.

Solution to Problem

A recognition processing system according to the present disclosure includes: a first sensor device that acquires an image signal by imaging; a second sensor device that performs an object detection process, a selection unit that selects one of a plurality of recognition processes based on information on the object detected by the detection process; and a recognition processing unit that executes the recognition process selected by the selection unit based on the image signal.

The selection unit may select one of the plurality of recognition processes according to a type of the object detected in the detection process.

The first sensor device may perform the imaging in a first period, the second sensor device may perform the detection process for at least a part of the first period, and the recognition processing unit may perform the recognition process in a third period after the lapse of the first period.

The first sensor device may include an imaging element and acquires the image signal by exposing the imaging element to light during the first period.

The recognition processing unit may include a plurality of recognizers that perform the plurality of recognition processes, the selection unit may select one of the plurality of recognizers, and the recognition processing unit may execute the recognition process using the selected recognizer.

The selection unit may select one of a plurality of recognition programs for executing the plurality of recognition processes, and the recognition processing unit may execute the recognition process by executing the selected recognition program.

The recognition processing system may include: a preprocessing unit that performs preprocessing on the image signal; and a setting unit that generates parameter information for the preprocessing based on the information on the object detected by the detection process, the preprocessing unit may perform the preprocessing on the image signal based on the parameter information, and the recognition processing unit may execute the recognition process based on the preprocessed image signal.

The information on the object may include at least one of a position and a type of the object.

The parameter information may include information for specifying an area to be extracted from the image signal.

The parameter information may include a setting value of at least one of a scaling process and a color setting process performed on a signal extracted from the area.

The recognition processing system may include: a prediction unit that predicts a position of the object in a next imaging period of the first sensor device based on the information on the object, the setting unit may generate the parameter information based on the predicted position of the object, and the recognition processing unit may execute the recognition process based on an image signal acquired by the imaging or an image signal acquired by the next imaging.

The first sensor device and the second sensor device may operate in synchronization with a synchronization signal.

The second sensor device may be a sensor device of a different type from the first sensor device.

The first sensor device may be a camera, and the second sensor device may be a radar.

A recognition processing device according to the present disclosure includes: a recognition processing unit that acquires an image signal obtained by imaging from a first sensor device, and executes one of a plurality of recognition processes based on the image signal; and a selection unit that acquires a result of an object detection process from a second sensor device and selects the one recognition process to be executed by the recognition processing unit from the plurality of recognition processes based on information on the detected object.

A recognition processing method according to the present disclosure includes: acquiring an image signal by imaging; performing an object detection process; selecting one of a plurality of recognition processes based on information on the object detected by the detection process; and executing the selected recognition processing based on the image signal.

DESCRIPTION OF EMBODIMENTS

Hereinafter, embodiments of the present disclosure will be described with reference to the drawings. In one or more embodiments shown in the present disclosure, the elements included in each embodiment can be combined with each other, and the combined result is also part of the embodiments shown in the present disclosure.

First Embodiment

Figure 1:
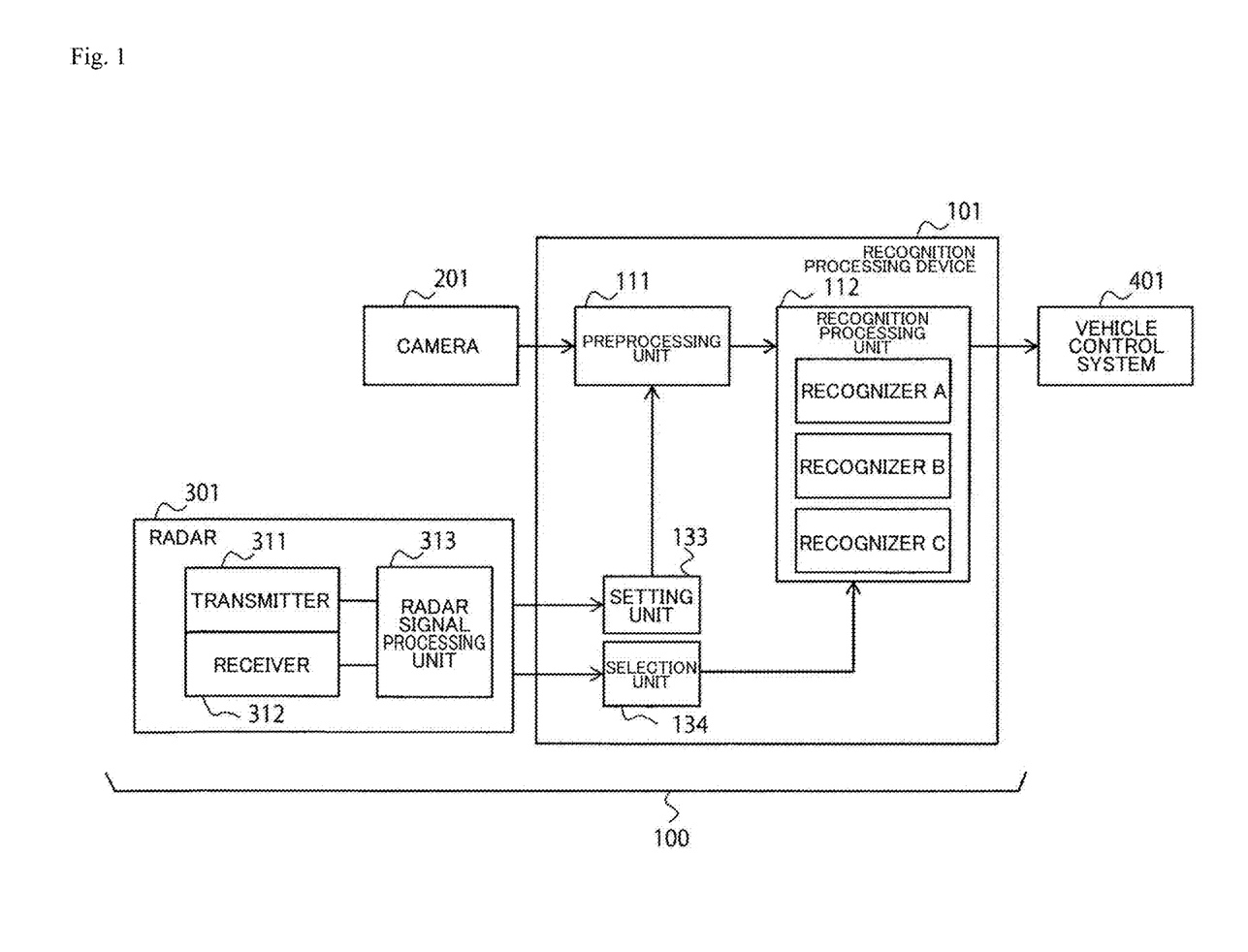
FIG. 1 is a block diagram of a recognition processing system according to the first embodiment.

FIG. 1 is a block diagram of a recognition processing system according to the first embodiment. A recognition processing system 100 of FIG. 1 includes a recognition processing device 101, a camera 201, and a radar 301. The recognition processing device 101 includes a preprocessing unit 111, a recognition processing unit 112, a setting unit 133, and a selection unit 134. The radar 301 includes a transmitter 311 and a receiver 312 and a radar signal processing unit 313. Each element of the recognition processing device 101 is configured of hardware, software (program), or both. Examples of hardware include processors such as CPUs (Central Processing Units), dedicated circuits, programmable circuits and memories.

The recognition processing system 100 is connected to a vehicle control system 401 by wire or wirelessly. The recognition processing system 100 and the vehicle control system 401 are mounted on a vehicle. Vehicles are, for example, electric vehicles, hybrid vehicles, gasoline vehicles, electric buses, robots, unmanned vehicles, automated driving vehicles, and the like. The recognition processing system may be mounted on a moving object other than a vehicle, for example, a drone, an airplane, a ship, a smartphone, or the like. The recognition processing system 100 performs an object recognition process using the camera 201 and the radar 301, and provides information representing the result of the recognition processing to the vehicle control system 401. The vehicle control system 401 supports the driving of the vehicle (for example, automated driving) based on the information provided from the recognition processing device 101.

The camera 201 is a sensor device that acquires an image signal by exposing an imaging element to light through an imaging lens during an exposure period to perform imaging. The camera 201 provides the acquired image signal to the preprocessing unit 111 of the recognition processing device 101. The camera 201 is an RGB camera that is mounted on a vehicle as an example, and captures the surrounding environment of the vehicle at regular sampling intervals. The operation of the camera 201 is controlled by, for example, an integrated control unit (not shown) of the vehicle. The camera 201 includes at least one of a monocular camera, a stereo camera, a ToF (Time Of Flight) camera, an infrared camera, and other cameras. The camera 201 is installed, for example, at at least one position of the front nose, side mirrors, rear bumpers, back doors, and the upper part of the windshield in the vehicle interior of the vehicle. A camera mounted on the front nose and the upper part of the windshield in the vehicle interior mainly acquires an image on the front side of the vehicle. The camera provided in the side mirror mainly acquires an image on the lateral side of the vehicle. A camera mounted on the rear bumper or back door mainly acquires an image on the rear side of the vehicle.

The radar 301 is a sensor device that performs object detection processing. The transmitter 311 of the radar 301 transmits a radio wave beam having a predetermined wavelength forward from a transmitting antenna, and the receiver 312 receives the reflected wave at a receiving antenna. The signal received by the receiver 312 is AD (Analog to Digital) converted and provided to the radar signal processing unit 313. The operation of the radar 301 is controlled in synchronization with the camera 201 by, for example, an integrated control unit (not shown) of the vehicle. The radar 301 is, for example, a millimeter-wave radar, but may be a radar having another wavelength. Like the camera 201, the radar 301 is installed at at least one position of, for example, the front nose of the vehicle, the side mirrors, the rear bumper, the back door, and the upper part of the windshield in the vehicle interior. As an example, the radar 301 is installed so that the sensing direction is the same as that of the camera 201. In the present embodiment, it is assumed that the radar 301 and the camera 201 sense the front of the vehicle, but the present invention is not limited to this.

The radar signal processing unit 313 performs signal processing using an FFT (range FFT, speed FFT, and azimuth FFT) based on the received signal from the receiver 312, and performs object detection processing. Specifically, for example, peak detection is performed in signal processing, and based on the result of peak detection, the distance to an object (target) that reflects radio waves, the speed of the object (relative speed), the angle of the object with respect to the subject vehicle, and the area where the object exists are detected.

Further, the radar signal processing unit 313 determines the type of the object that reflects the radio wave. For example, it is determined whether it is a vehicle or a person. As a simple method of determination, if the intensity of the peak of the wave reflected from the object is equal to or more than a certain value and the relative speed is equal to or more than a first threshold value, it may be determined that the object is a vehicle. If the intensity of the peak is less than a certain value and the relative speed is less than a second threshold value, it may be determined that the object is a person. Alternatively, it may be determined whether the object is a person or an object based on the distance to the object and the size of the area where the object exists. Alternatively, a determination method using machine learning may be used. For example, the type of the object may be determined using a discriminative model generated in advance by machine learning with the reflected signal as an input. When performing machine learning, teacher data that associates the signal reflected from an object with a known object type with the object type is prepared in advance, and a discriminative model is generated by a learning algorithm such as a neural network based on the teacher data. The types of objects are not limited to the two types of vehicle and person. For example, there may be three types of automobile, motorcycle, and person, or four or more types.

The radar signal processing unit 313 provides the recognition processing device 101 with information including the distance to the detected object, the speed and the angle, the determined type of the object, and the like as the object detection information.

Figure 2:
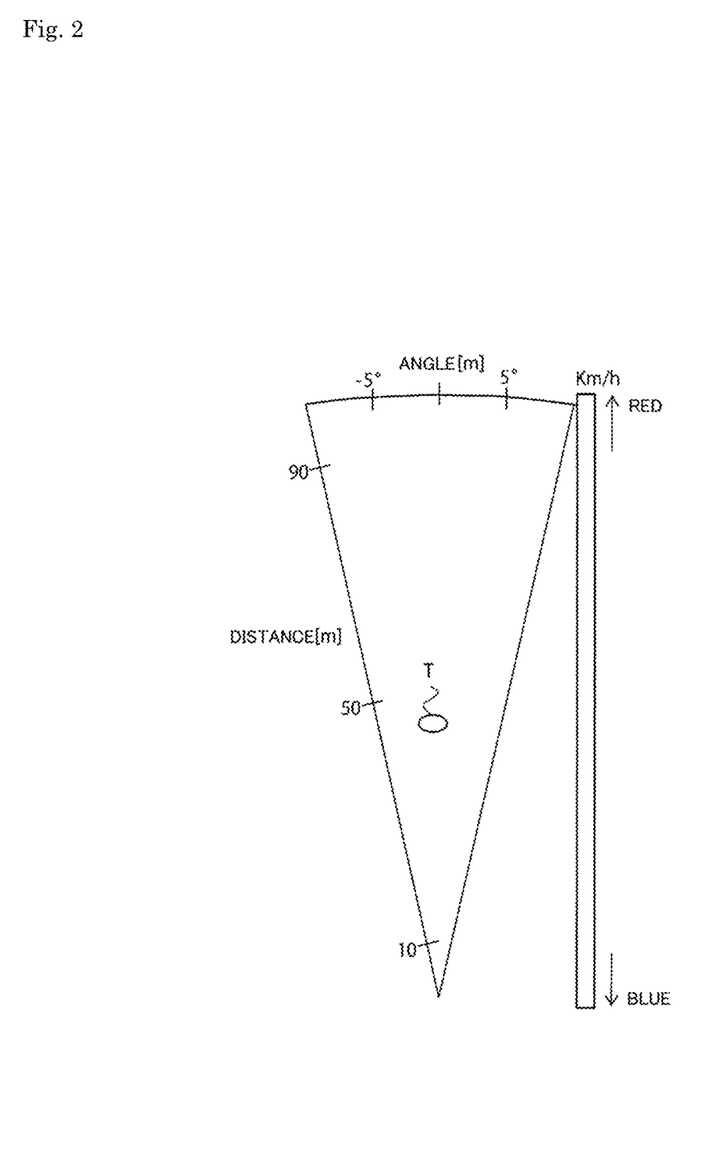
FIG. 2 is a diagram showing an example showing a distance, an angle, and a speed of an object as a map.

FIG. 2 shows an example in which the distance, angle, and speed of the object T in the object detection information are shown as a map. The shape of the map in FIG. 2 corresponds to the shape of a detection range of the radar 301. The area of the object T in the map is colored with a color selected from the range of red to blue depending on the speed. In the example of FIG. 2, an example is shown in which one object is detected, but two or more objects may be present.

A map showing the signal strength [dBm] at each position in the detection range of the radar 301 may be created in the same manner. In this case, each position in the map may be colored according to the signal strength. Each position in the area of the map is colored with, for example, a color selected from the range of red to blue. As an example, red has the highest signal strength and blue has the lowest signal strength.

The recognition processing device 101 acquires an image signal provided from the camera 201, and also acquires object detection information provided from the radar 301.

The selection unit 134 selects one recognizer from a plurality of recognizers included in the recognition processing unit 112 based on the object detection information provided from the radar signal processing unit 313, and provides the information specifying the selected recognizer to the recognition processing unit 112. In the present embodiment, as an example, the type of the object indicated by the object detection information is specified, and the recognizer corresponding to the specified type is selected.

The recognition processing unit 112 includes a recognizer A, a recognizer B, and a recognizer C as a plurality of recognizers. The recognizer A is a recognizer used when the type of the object is type A, and is used when performing recognition processing of an image signal including object A. The recognizer B is a recognizer used when the type of the object is type B, and is used when performing recognition processing of an image signal including object B. The recognizer C is a recognizer used when the type of the object is type C, and is used when performing image recognition of an image signal including object C. The recognition processing unit 112 includes three recognizers, but may include two or four or more recognizers.

When the object detection information indicates the type A, the selection unit 134 provides the recognition processing unit 112 with information designating the recognizer A. When the object detection information indicates the type B, the selection unit 134 provides the recognition processing unit 112 with information designating the recognizer B. When the object detection information indicates the type C, the selection unit 134 provides the recognition processing unit 112 with information designating the recognizer C. In this example, different recognizers are used for each type of object, but the same recognizer may be commonly used for a plurality of types of recognition processing.

In the present embodiment, the recognizer is selected according to the type of the object, but other methods may be used. For example, a plurality of types of recognizers may be prepared according to the magnitude of the speed of the object, and the recognizer may be selected according to the speed indicated by the object detection information.

The setting unit 133 generates parameter information including the setting value of the preprocessing to be executed for the image signal by the preprocessing unit 111 based on the object detection information provided from the radar signal processing unit 313.

For example, based on the detection position of the object and the area where the object exists, parameter information including an instruction to cut out an image of the area including the object in the image signal of the camera 201 and scaling (enlargement or reduction) of the cut-out image to a predetermined size is generated. The correspondence between the detection range of the radar 301 and the imaging range of the camera 201 is known in advance, and it is possible to calculate which area of the image signal of the camera 201 corresponds to the area of the object detected by the radar 301.

Further, the setting unit 133 performs color setting processing of the image signal or the cut-out image signal based on the object detection information. For example, depending on the type of object, adjustment of at least one of brightness, saturation and lightness is performed. Specifically, corrections such as increasing or decreasing the brightness of a specific color may be performed according to the type of the object. By performing the color setting process, it is possible to improve the accuracy of the image recognition performed by the recognition processing unit 112.

The preprocessing unit 111 performs preprocessing according to the parameter information provided from the setting unit 133 based on the image signal provided from the camera 201. That is, the preprocessing unit 111 performs preprocessing according to the parameter information provided by the feedforward.

The preprocessing unit 111 provides the recognition processing unit 112 with the preprocessed image signal obtained by performing the preprocessing on the image signal.

The recognition processing unit 112 performs recognition processing on the image signal after preprocessing provided from the preprocessing unit 111 using a recognizer indicated by the information provided from the selection unit 134. For example, when the recognizer A is for an object type of person and the recognition processing is performed using the recognizer A, the recognition processing for person is performed. Specifically, for example, it is identified which direction the person included in the image signal is facing, whether the person is wearing sunglasses, whether the person is wearing an earphone, whether the person is an adult or a child, or whether the person is male or female. Similarly, when the recognizer B is for an object type of a vehicle and the recognition processing is performed using the recognizer B, the recognition processing for vehicle is performed. Specifically, for example, it is identified which direction the vehicle included in the image signal is facing, whether the vehicle is on a slope, or whether the vehicle is in the same lane as the subject vehicle. Since each recognizer performs processing specialized for a specific type of object, the amount of calculation is small and high-speed processing is possible.

The recognition processing unit 112 provides the vehicle control system 401 with information representing the result of the recognition processing. The vehicle control system 401 controls the vehicle based on the provided information. For example, when a person is facing in the direction opposite to the vehicle, a process such as sounding an alarm is performed to notify that the vehicle is approaching from behind the person. In addition, when a person wears sunglasses, a warning light is emitted to notify that the vehicle is approaching. If the person is a child, a warning message sound for the child may be output. Other processing may be performed.

Figure 3:
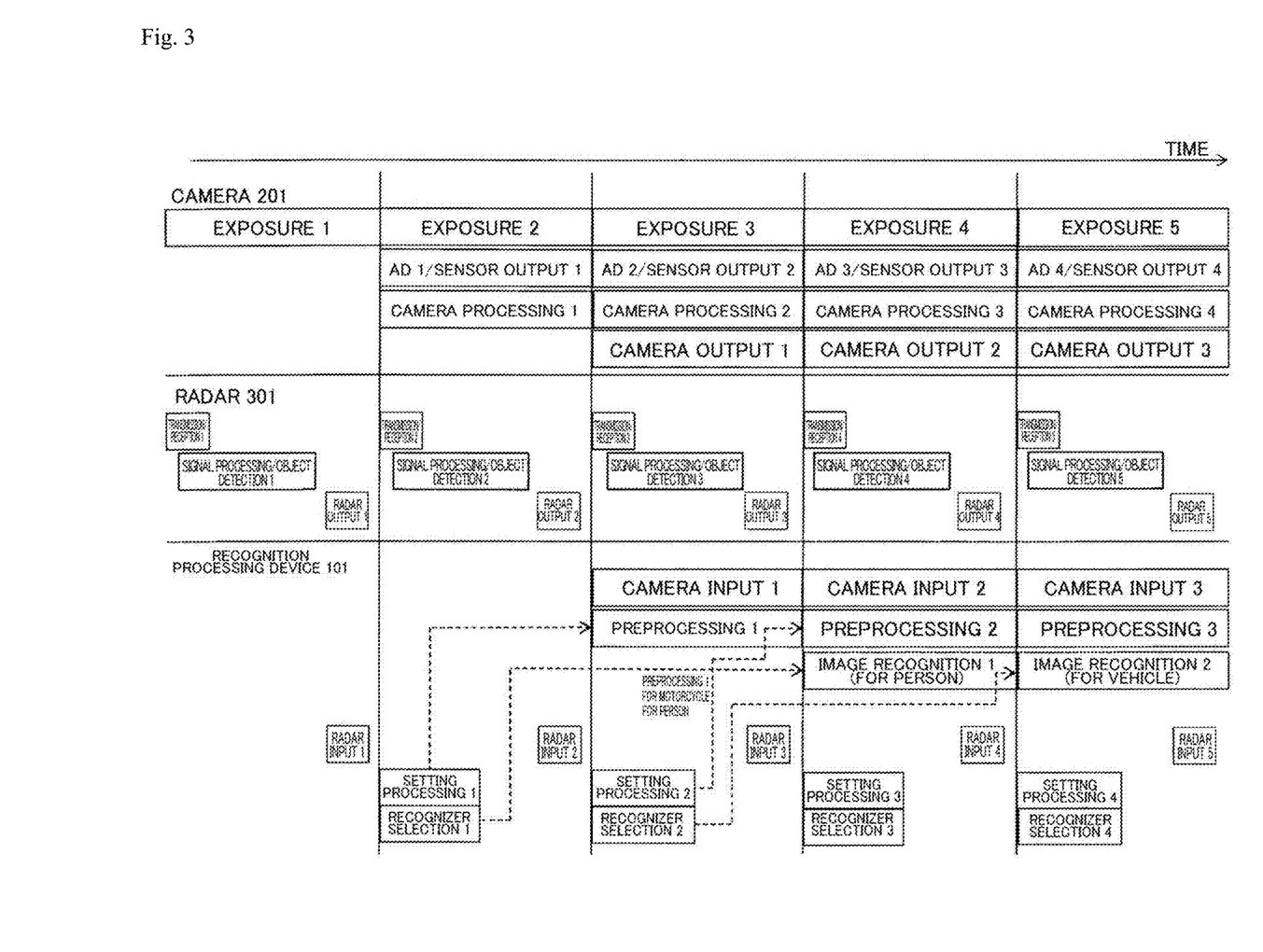
FIG. 3 is a diagram showing an example of the timings of operations of the recognition processing system of FIG. 1.

FIG. 3 shows an example of the timings of operations of the recognition processing system 100 of FIG. 1. The camera 201 and the radar 301 operate synchronously based on a synchronization signal provided from an integrated control unit (not shown). It is assumed that the camera 201 and the radar 301 operate at the same frame rate (for example, 30 frames/sec).

In a first cycle, the camera 201 performs exposure (exposure 1). During the exposure of the camera 201, the radar 301 receives millimeter wave radiation and reflected wave (transmission/reception 1), and performs AD conversion, signal processing, and object detection processing (signal processing/object detection 1) to output object detection information (radar output 1). The object detection information is input to the recognition processing device 101 (radar input 1).

When the exposure 1 is completed, the camera 201 starts a second cycle of exposure (exposure 2). In parallel with the exposure 2, the camera 201 reads out the signal received by the imaging element during the exposure 1 and performs AD conversion (AD1), generates an image signal including the signal of each pixel (sensor output 1), and performs camera processing (camera processing 1). Camera processing includes, for example, gain adjustment, black level adjustment, white level adjustment, noise removal, gamma processing, and the like. During the period when the camera 201 is performing exposure 2, the radar 301 receives millimeter wave radiation and reflected wave (transmission/reception 2) as the second cycle of processing, and performs AD conversion, signal processing, and object detection processing (signal processing/object detection 2) to output object detection information (radar output 2).

While the camera 201 and the radar 301 are performing the second cycle of processing, the selection unit 134 selects a recognizer based on the object detection information. The selection unit 134 provides the recognition processing unit 112 with information representing the selected recognizer as information indicating the recognizer to be used for the first recognition processing (recognizer selection 1). In the example in the figure, a recognizer for person is selected. Further, the setting unit 133 generates parameter information including the setting value for the first preprocessing performed by the preprocessing unit 111 based on the object detection information, and provides the parameter information to the preprocessing unit 111 (setting process 1). After that, the recognition processing device 101 receives the object detection information output in the second cycle of processing of the radar 301 (radar input 2).

When the exposure 2 is completed, the camera 201 starts a third cycle of exposure (exposure 3). In parallel with the exposure 3, the camera 201 reads out the signal received by the imaging element during the exposure 2, performs AD conversion (AD2), generates an image signal (sensor output 2), and performs camera processing (camera processing 2). Further, the camera 201 provides the image signal generated in the camera processing 1 of the second cycle of processing to the preprocessing unit 111 of the recognition processing device 101 (camera output 1).

During the period when the camera 201 is performing the exposure 3, the radar 301 receives the millimeter wave radiation and the reflected wave (transmission/reception 3) as the third cycle of processing, and performs AD conversion, signal processing and object detection processing (signal processing/object detection 3) to output object detection information (radar output 3).

While the camera 201 and the radar 301 are performing the third cycle of processing, the preprocessing unit 111 receives an image signal (image signal captured by exposure 1) from the camera 201 (camera input 1), and performs preprocessing on the image signal based on the parameter information provided from the setting unit 133 (preprocessing 1). The recognition processing device 101 provides the preprocessed image signal to the recognition processing unit 112. Further, the selection unit 134 selects a recognizer based on the object detection information output from the radar 301 in the second cycle of processing (recognizer selection 2), and provides the information representing the selected recognizer to the recognition processing unit 112 as information indicating the recognizer to be used for the second recognition processing. The recognition processing unit 112 may include a buffer that stores the information provided from the selection unit for a plurality of cycles. The setting unit 133 generates parameter information including the setting value for the second preprocessing performed in the next cycle (fourth cycle) based on the object detection information output from the radar 301 in the second cycle of processing and provides the parameter information to the preprocessing unit 111. The preprocessing unit 111 may include a buffer that stores the information provided from the setting unit 133 for a plurality of cycles. Further, the recognition processing device 101 receives the object detection information output in the third cycle of processing of the radar 301 (radar input 3).

In the fourth cycle, the camera 201, the radar 301, the setting unit 133, the selection unit 134, and the preprocessing unit 111 perform the same processing. Further, in the fourth cycle, the recognition processing unit 112 performs the first recognition processing using the recognizer (the recognizer for person in the example of the figure) selected by the selection unit 134 based on the image signal preprocessed in the third cycle. The recognition processing unit 112 provides the vehicle control system 401 with information representing the result of the recognition processing. In the fifth and subsequent cycles, the same processing as in the fourth cycle is repeated.

As described above, in the processing of FIG. 3, parameter information including the setting value of preprocessing is generated using the difference in processing delay between the camera 201 and the radar 301 based on the information on the object detected by the radar 301 before the image signal of the camera 201 is input to the recognition processing device 101. Based on this parameter information, preprocessing of the image signal input to the recognition processing device 101 is performed. Therefore, since the parameter information can be provided to the preprocessing unit by feedforward (because feedback from the recognition processing unit is unnecessary), the preprocessing can be executed at high speed while suppressing the frame latency. Further, by performing the recognition processing using a recognizer corresponding to the information on the detected object, the amount of calculation can be reduced and the recognition processing can be accelerated. That is, the recognition processing unit 112 may perform the recognition processing after narrowing down the target, and it is not necessary to perform the calculation processing on the premise that there is a possibility that a plurality of types of targets exist. Thus, it is possible to accelerate processing and reduce power consumption.

Figure 4:
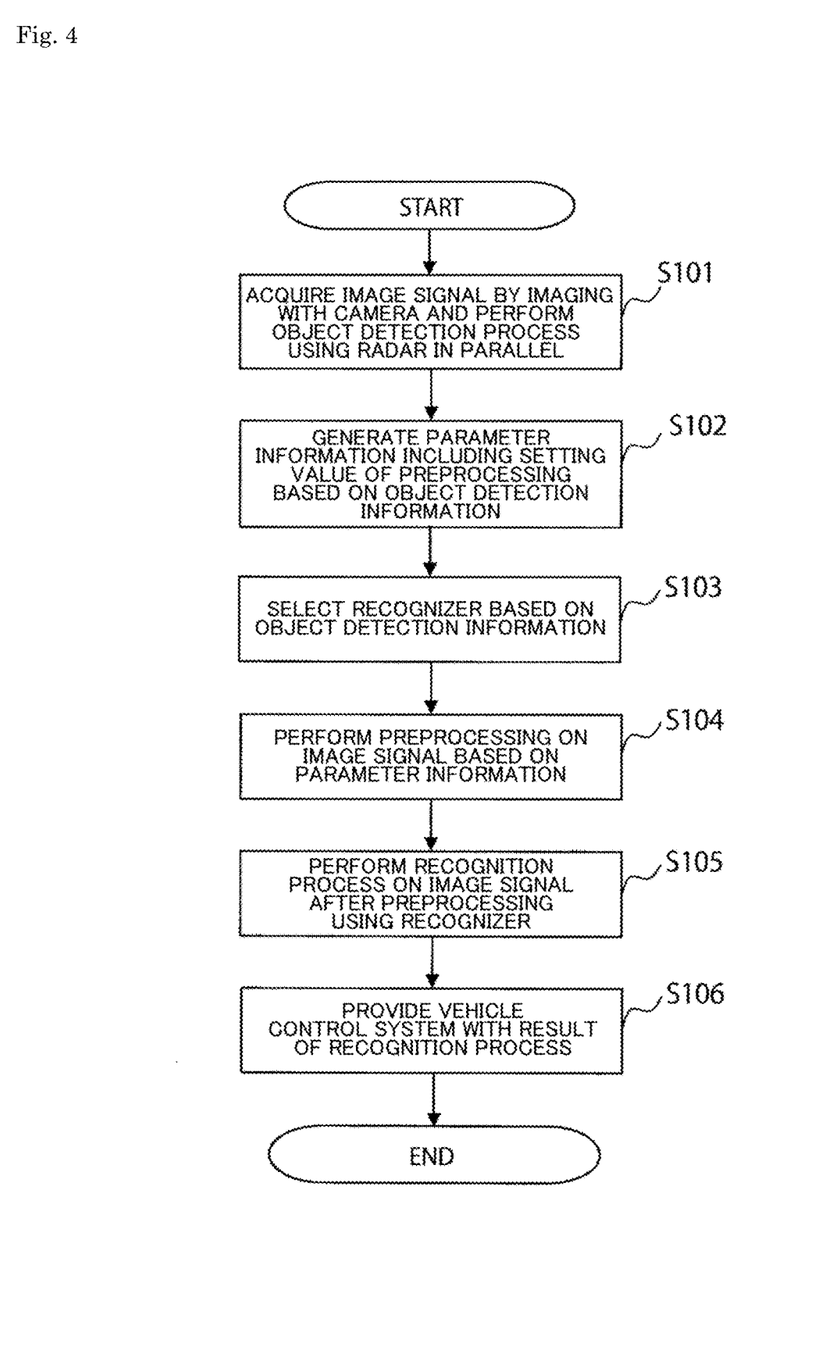
FIG. 4 is a flowchart of an example of the operation of the recognition processing system according to the present embodiment.

FIG. 4 is a flowchart of an example of the operation of the recognition processing system according to the present embodiment. An image signal is acquired by imaging with the camera 201 (S101). In parallel with the imaging by the camera 201, the radar 301 performs the object detection process (S101).

The setting unit 133 generates parameter information including the setting value of the preprocessing based on the object detection information acquired by the object detection process (S102).

Further, the selection unit 134 selects a recognizer from a plurality of recognizers based on the object detection information (for example, the type of the object) (S103).

The preprocessing unit 111 performs preprocessing on the image signal based on the parameter information (S104).

The recognition processing unit 112 performs recognition processing on the image signal after preprocessing using the selected recognizer (S105). The recognition processing unit 112 provides the result of the recognition processing to the vehicle control system 401 (S106).

According to the present embodiment, parameter information including the setting value of the preprocessing performed by the preprocessing unit is provided to the preprocessing unit by feedforward using the difference in processing delay between the camera 201 and the radar 301. As a result, the processing speed of the preprocessing unit can be increased, and the problem of delay due to feedback, which has been a problem in the past, can be solved.

Further, according to the present embodiment, the recognition processing is performed using a recognizer corresponding to the type of the object specified based on the result of the object detection process. Thus, it is possible to perform recognition processing that narrows down the recognition target (type of object), and reduces the amount of calculation in the recognition processing. Thus, it is possible to accelerate the recognition processing (improve the processing latency) and reduce the power consumption.

As described above, according to the present embodiment, the sensor fusion by the camera and the radar whose output is faster than that of the camera enables the setting of the preprocessing by the feedforward and the recognition processing after narrowing down the target. Thus, it is possible to improve the processing latency and reduce the power consumption.

The camera 201 and the laser 301 of the present embodiment are examples of sensor devices, and various sensor devices can be used. For example, as the camera 201, a sensor device such as an infrared camera or a ToF (Time Of Flight) camera may be used in addition to the RGB camera. Further, instead of the laser 301, a sensor device such as LIDAR (Light Detection and Ranging, Laser Imaging Detection and Ranging) or a sound wave sensor may be used.

Second Embodiment

Figure 5:
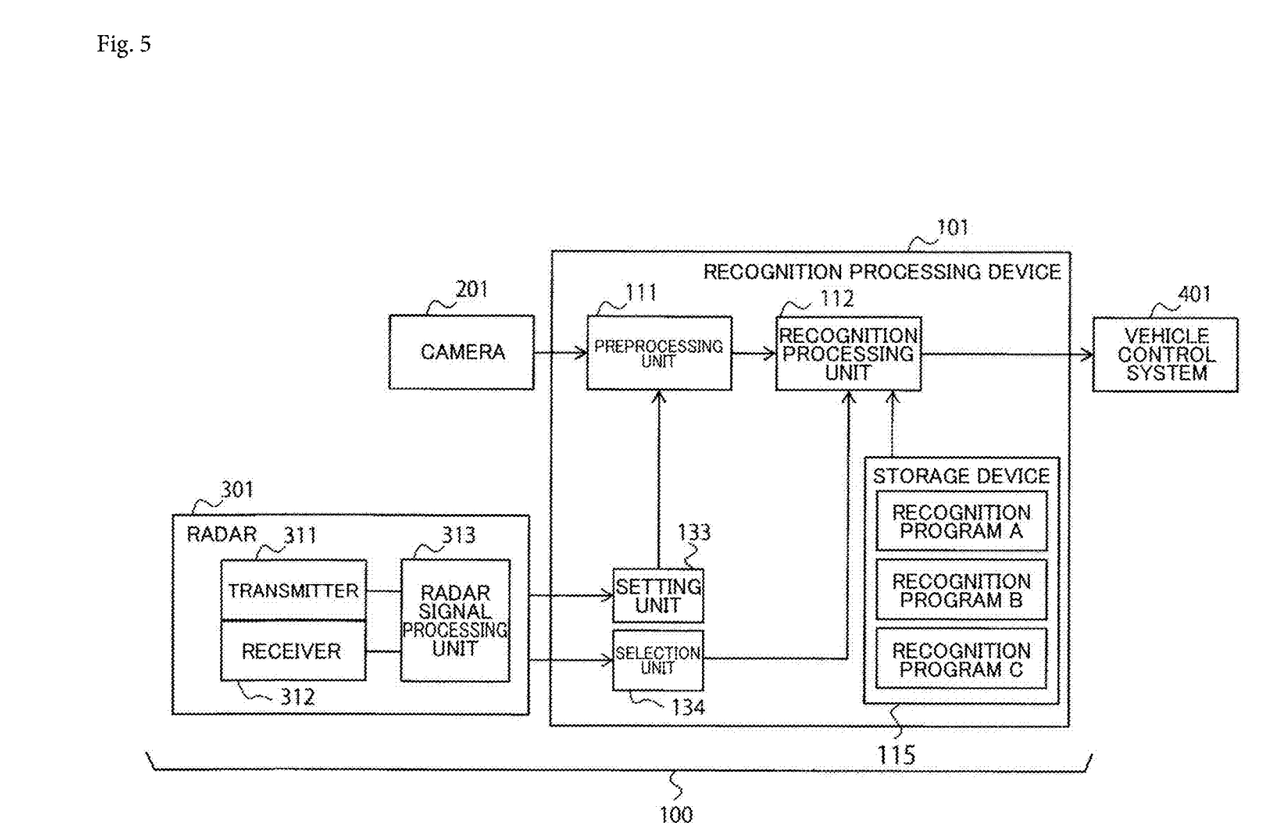
FIG. 5 is a block diagram of a recognition processing system according to a second embodiment.

FIG. 5 is a block diagram of a recognition processing system according to the second embodiment. The difference from the first embodiment is that the recognition processing unit 112 executes the recognition processing using a recognition program instead of the recognizer. Hereinafter, the differences from the first embodiment will be mainly described, and the same description as that of the first embodiment will be omitted except for the expanded or modified processing.

The recognition processing device 101 includes a storage device 115. The storage device 115 stores the recognition programs A, B, and C as a plurality of recognition programs. The storage device 115 is an arbitrary storage device such as a hard disk device, an optical disk device, an SSD device, and a storage device.

The recognition program A is a recognition program used when the type of the object is type A, and is used when performing recognition processing of an image signal including the object A. The recognition program B is a recognition program used when the type of the object is type B, and is used when performing recognition processing of an image signal including the object B. The recognition program C is a recognition program used when the type of the object is type C, and is used when performing image recognition of an image signal including the object C. The storage device 115 includes three recognition programs, but may include two or four or more recognition programs.

When the object detection information indicates the type A, the selection unit 134 provides the recognition processing unit 112 with information for designating the recognition program A. When the object detection information indicates the type B, the selection unit 134 provides the recognition processing unit 112 with information for designating the recognition program B. When the object detection information indicates the type C, the selection unit 134 provides the recognition processing unit 112 with information for designating the recognition program C. In this example, different recognition programs are used for each type of object, but the same recognition program may be commonly used for a plurality of types of recognition processing.

The recognition processing unit 112 includes a processor such as a CPU for executing the program and a memory for expanding the program code. The recognition processing unit 112 is connected to the storage device 115 via a bus, and can access the storage device 115. The recognition processing unit 112 reads out the recognition program indicated by the information provided from the selection unit 134 from the storage device 115. The recognition processing unit 112 expands the read recognition program into a memory and executes it to perform recognition processing on the image signal after preprocessing provided from the preprocessing unit 111.

Although the storage device 115 is provided inside the recognition processing device 101, it may be provided as a server or network storage outside the recognition processing device 101 via a communication network.

According to the second embodiment, a recognition program corresponding to the type of the object is selected, and the selected recognition program is executed. By expanding or modifying the recognition program, it is easy to expand or modify the recognition processing, and the variation of the recognition processing can be easily increased. Further, by adding a recognition program later, it is easy to add new recognition processing. The recognition processing device 101 may acquire instruction data from the user via the user interface and expand, modify, or add the recognition program according to the instruction data.

Third Embodiment

Figure 6:
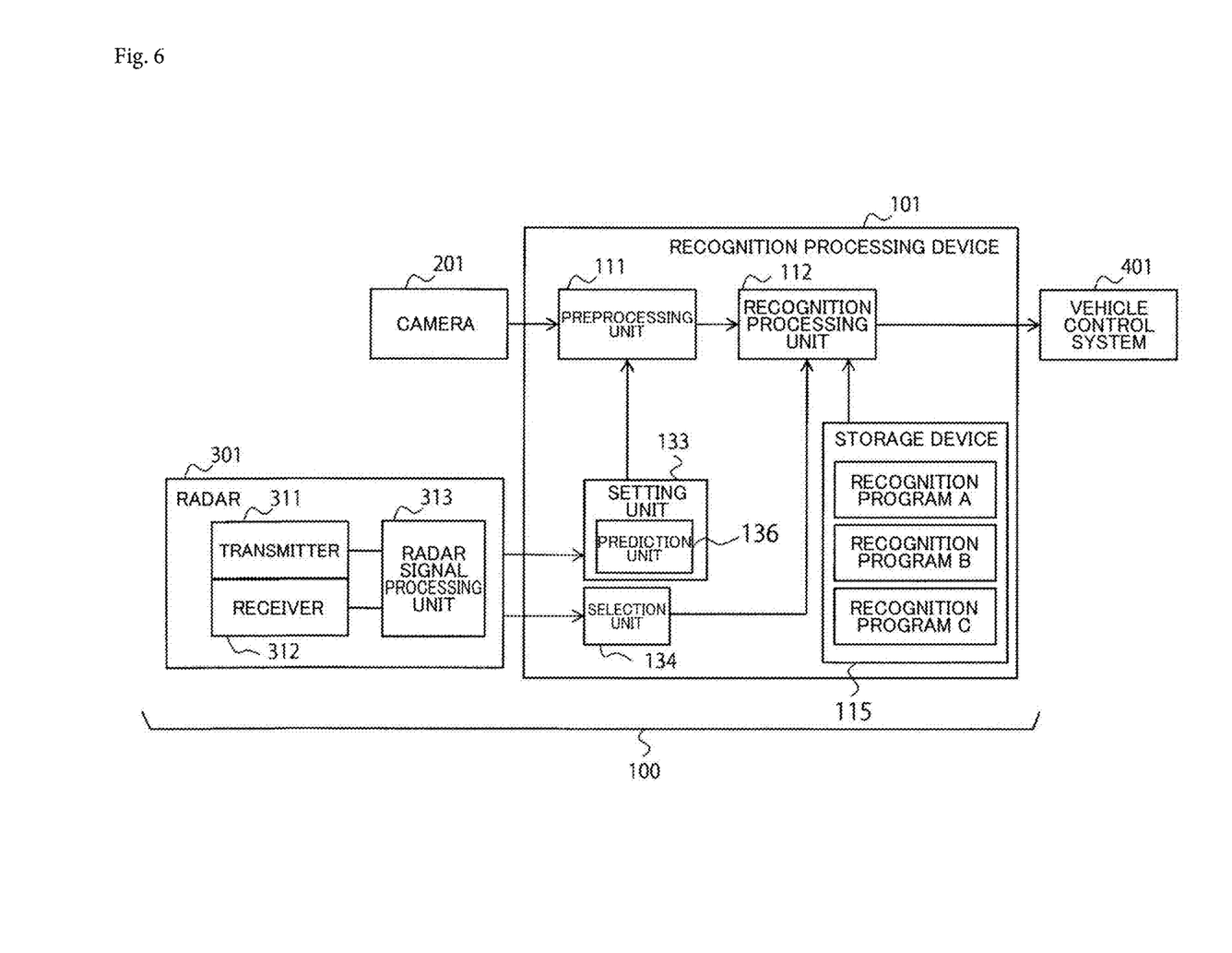
FIG. 6 is a block diagram of a recognition processing system according to a third embodiment.

FIG. 6 is a block diagram of a recognition processing system according to the third embodiment. The difference from the second embodiment is that a prediction unit 136 is added to the setting unit 133. It is also possible to add the setting unit 133 to the setting unit 133 of the first embodiment. Although the prediction unit 136 is added to the setting unit 133, it may be arranged as an independent functional block outside the setting unit 133. Hereinafter, the differences from the second embodiment will be mainly described, and the same description as that of the second embodiment will be omitted except for the expanded or modified processing.

In the present embodiment, the camera 201 and the radar 301 operate at different frame rates. In this example, the camera 201 operates at a frame rate twice as fast as the radar 301. As an example, the camera 201 has 60 frames/sec and the radar 301 has 30 frames/sec. However, if the camera 201 is faster than the frame rate of the radar 301, it is not limited to twice.

Since the camera 201 has a frame rate twice as fast as the radar 301, the camera 201 operates for two cycles while the radar 301 operates for one cycle. For example, the cycles 2X−1 and 2X of the camera 201 (X is an integer of 1 or more) correspond to the cycle X of the radar 301.

The prediction unit 136 performs tracking prediction based on the object detection information acquired in the process of the cycle 1 of the radar 301, and predicts the position of the object in the cycle 3 of the camera 201 (the first half period of the cycle 2 of the radar 301). For example, the position after a predetermined time (for example, one frame of the camera) is predicted from the information on the position and speed of the object. The setting unit 133 generates parameter information for the preprocessing unit 111 based on the predicted position. On the other hand, the selection unit 134 selects a recognition program based on the object detection information (object type) acquired in the process of cycle 1 of the radar 301, and provides the recognition processing unit 112 with information for designating the selected recognition program.

The preprocessing unit 111 performs preprocessing on the image signal output in the cycle 4 of the camera 201 (the image signal captured in the cycle 3 of the camera 201) based on the parameter information provided from the setting unit 133. The recognition processing unit 112 performs recognition processing on the preprocessed image signal using a recognition program indicated by the information provided from the selection unit 134.

The preprocessing unit 111 may omit the preprocessing for the image signal output in the cycle 3 of the camera 201 (the image signal captured in the cycle 2 of the camera 201), or may perform the preprocessing (for example, preprocessing is performed using the parameter information previously calculated or the initial parameter information given in advance). When performing preprocessing of the image signal, the recognition processing unit 112 selects one of the image signal preprocessed in the cycle 3 of the camera 201 and the image signal preprocessed in the cycle 4 of the camera 201. The recognition processing is performed on the selected image signal using the recognition program indicated by the information provided from the selection unit 134.

In this way, the cycle 2X−1 and the cycle 2X (X is an integer of 1 or more) of the camera 201 correspond to the cycle X of the radar 301. Based on the object detection information acquired in the cycle X of the radar 301, the position of the object in the cycle 2(X+1)−1 of the camera 201 is predicted. Preprocessing parameter information is generated based on the predicted position, and the image signal captured in cycle 2(X+1)−1 of camera 201 (the image signal output from camera 201 in cycle 2(X+1)) is preprocessed based on the parameter information. The preprocessed image signal is recognized by the recognizer selected based on the object detection information acquired in the cycle X of the radar 301. Since this enables preprocessing based on the latest position of the object, more accurate recognition processing can be performed.

Figure 7:
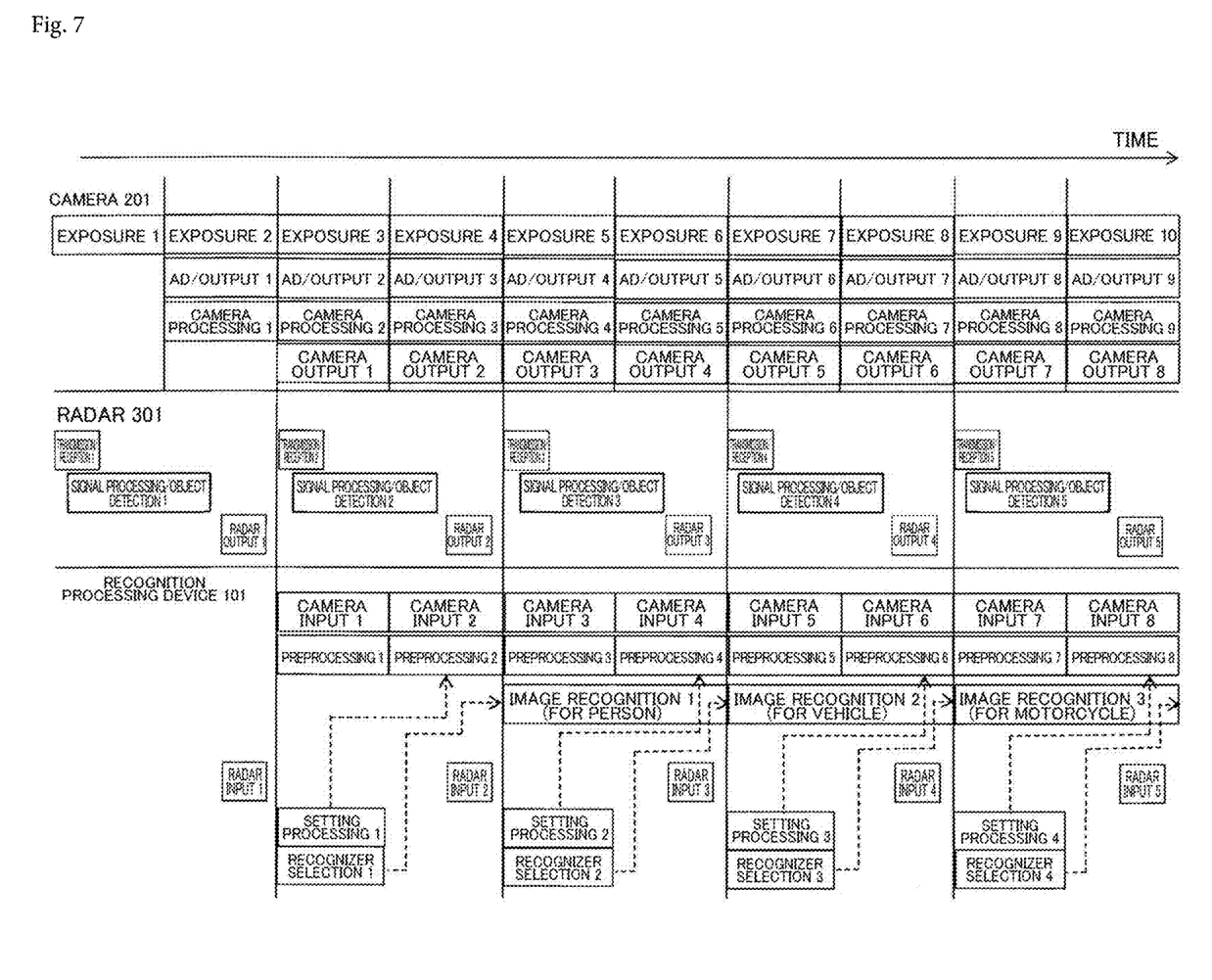
FIG. 7 is a diagram showing an example of the timings of operations of the recognition processing system of FIG. 6.

FIG. 7 shows an example of the timings of operations of the recognition processing system 100 of FIG. 6. The camera 201 and the radar 301 operate synchronously based on a synchronization signal provided from an integrated control unit (not shown). It is assumed that the camera 201 operates at a frame rate twice that of the radar 301.

In the first cycle of the camera 201, the camera 201 performs exposure (exposure 1), and after the completion of exposure 1, performs exposure (exposure 2) in the second cycle. In parallel with the exposure 2, the signal received by the imaging element during the exposure 1 is read out, AD conversion (AD1), image signal generation (output 1), and camera processing (camera processing 1) are performed.

During exposure 1 and exposure 2 of the camera 201, the radar 301 receives millimeter wave radiation and reflected wave in the first cycle (transmission/reception 1), and performs AD conversion, signal processing and object detection processing (signal processing/object detection 1) to output object detection information (radar output 1). The object detection information is input to the recognition processing device 101 (radar input 1).

When the exposure 2 is completed, the camera 201 starts a third cycle of exposure (exposure 3). In parallel with the exposure 3, the camera 201 reads out the signal received by the imaging element during the exposure 2, performs AD conversion (AD2), generates an image signal (output 2), and performs camera processing (camera processing 2). Further, the camera 201 provides the image signal processed by the second cycle of processing of the camera processing 1 to the preprocessing unit 111 of the recognition processing device 101 (camera output 1). When the exposure 3 is completed, the camera 201 starts a fourth cycle of exposure (exposure 4). In parallel with the exposure 4, the camera 201 reads out the signal received by the imaging element during the exposure 3, performs AD conversion (AD3), generates an image signal (output 3), and performs camera processing (camera processing 3). Further, the camera 201 provides the image signal processed by the third cycle of processing of the camera processing 2 to the preprocessing unit 111 of the recognition processing device 101 (camera output 2).

While the camera 201 is performing exposure 3 and exposure 4, the radar 301 receives millimeter wave radiation and reflected wave as the second cycle of processing (transmission/reception 2), and performs AD conversion, signal processing and object detection processing (signal processing/object detection 2) to output object detection information (radar output 2).

While the camera 201 is performing the third cycle of processing (exposure 3 and the like), the selection unit 134 selects a recognizer based on the object detection information (for example, the type of the object), and provides information representing the selected recognizer to the recognition processing unit 112 (recognizer selection 1). In the example in the figure, a recognizer for person is selected. Further, the setting unit 133 tracks and predicts the position of the object in the third cycle of the camera 201 (the position in the first half of the second cycle of the radar 301) based on the object detection information, and generates parameter information including the setting value of the preprocessing performed by the preprocessing unit 111 based on the prediction result. The parameter information is provided to the preprocessing unit 111 (setting process 1). After that, the recognition processing device 101 receives the object detection information output in the second cycle of processing of the radar 301 (radar input 2).

The preprocessing unit 111 of the recognition processing device 101 omits the preprocessing (preprocessing 1) of the image signal output by the camera output 1 in the third cycle of the camera 201, and performs preprocessing (preprocessing 2) on the image signal output in the fourth cycle of the camera 201 (image signal captured in the third cycle of the camera 201) based on the parameter information provided from the setting unit 133. The preprocessing 2 is performed in at least a part of the period of exposure 4 of the camera 201.

The recognition processing unit 112 of the recognition processing device 101 performs recognition processing (image recognition 1) on the image signal processed by the preprocessing 2 using the recognizer indicated by the information provided from the selection unit 134 during at least a part of the period of the fifth cycle and the sixth cycle of the camera 201 (the period of the third cycle of the radar 301). The recognition processing device 101 provides the result of the recognition processing to the vehicle control system 401.

Although the preprocessing 1 is omitted in the above processing, the preprocessing 1 may be executed. In this case, instead of the preprocessing 1 recognizing the image signal output by the preprocessing 2, the image signal output by the preprocessing 1 may be recognized. The recognition processing unit 112 may select one of the image signal output in the preprocessing 1 and the image signal output in the preprocessing 2 and recognize the selected image signal.

As described above, in the present embodiment, the position of the object in the cycle 2(X+1)−1 of the camera 201 is predicted based on the object detection information acquired in the cycle X of the radar 301 corresponding to both the cycle 2X−1 and the cycle 2X of the camera 201, and the parameter information for the preprocessing is generated based on the predicted position. Based on this parameter information, the image signal captured in the cycle 2(X+1)−1 of the camera 201 (the image signal output in the cycle 2(X+1)) is preprocessed. Since this enables preprocessing based on the latest position of the object, more accurate recognition processing can be performed.

It should be noted that the above-described embodiments show examples for embodying the present disclosure, and the present disclosure can be implemented in various other forms. For example, various modifications, substitutions, omissions, or combinations thereof are possible without departing from the gist of the present disclosure. Such forms of modifications, substitutions, and omissions are included in the scope of the invention described in the claims and the scope of equivalence thereof, as included in the scope of the present disclosure.

In addition, the effects of the present disclosure described herein are merely exemplary and may have other effects.

The present disclosure may have the following configuration.

[Item 1]

A recognition processing system including: a first sensor device that acquires an image signal by imaging; a second sensor device that performs an object detection process, a selection unit that selects one of a plurality of recognition processes based on information on the object detected by the detection process; and a recognition processing unit that executes the recognition process selected by the selection unit based on the image signal.

[Item 2]

The recognition processing system according to Item 1, wherein the selection unit selects one of the plurality of recognition processes according to a type of the object detected in the detection process.

[Item 3]

The recognition processing system according to Item 1 or 2, wherein the first sensor device performs the imaging in a first period, the second sensor device performs the detection process for at least a part of the first period, and the recognition processing unit performs the recognition process in a third period after the lapse of the first period.

[Item 4]

The recognition processing system according to Item 3, wherein the first sensor device includes an imaging element and acquires the image signal by exposing the imaging element to light during the first period.

[Item 5]

The recognition processing system according to any one of Items 1 to 4, wherein the recognition processing unit includes a plurality of recognizers that perform the plurality of recognition processes, the selection unit selects one of the plurality of recognizers, and the recognition processing unit executes the recognition process using the selected recognizer.

[Item 6]

The recognition processing system according to any one of Items 1 to 5, wherein the selection unit selects one of a plurality of recognition programs for executing the plurality of recognition processes, and the recognition processing unit executes the recognition process by executing the selected recognition program.

[Item 7]

The recognition processing system according to any one of Items 1 to 6, further including: a preprocessing unit that performs preprocessing on the image signal; and a setting unit that generates parameter information for the preprocessing based on the information on the object detected by the detection process, wherein the preprocessing unit performs the preprocessing on the image signal based on the parameter information, and the recognition processing unit executes the recognition process based on the preprocessed image signal.

[Item 8]

The recognition processing system according to Item 7, wherein the information on the object includes at least one of a position and a type of the object.

[Item 9]

The recognition processing system according to Item 8, wherein the parameter information includes information for specifying an area to be extracted from the image signal.

[Item 10]

The recognition processing system according to Item 9, wherein the parameter information includes a setting value of at least one of a scaling process and a color setting process performed on a signal extracted from the area.

[Item 11]

The recognition processing system according to any one of Items 7 to 10, further including: a prediction unit that predicts a position of the object in a next imaging period of the first sensor device based on the information on the object, wherein the setting unit generates the parameter information based on the predicted position of the object, and the recognition processing unit executes the recognition process based on an image signal acquired by the imaging or an image signal acquired by the next imaging.

[Item 12]

The recognition processing system according to any one of Items 1 to 1, wherein the first sensor device and the second sensor device operate in synchronization with a synchronization signal.

[Item 13]

The recognition processing system according to any one of Items 1 to 12, wherein the second sensor device is a sensor device of a different type from the first sensor device.

[Item 14]

The recognition processing system according to Item 13, wherein the first sensor device is a camera, and the second sensor device is a radar.

[Item 15]

A recognition processing device including: a recognition processing unit that acquires an image signal obtained by imaging from a first sensor device, and executes one of a plurality of recognition processes based on the image signal; and a selection unit that acquires a result of an object detection process from a second sensor device and selects the one recognition process to be executed by the recognition processing unit from the plurality of recognition processes based on information on the detected object.

[Item 16]

A recognition processing method including: acquiring an image signal by imaging; performing an object detection process; selecting one of a plurality of recognition processes based on information on the object detected by the detection process; and executing the selected recognition processing based on the image signal.

REFERENCE SIGNS LIST

100 Recognition processing system
101 Recognition processing device
201 Camera
301 Radar
111 Preprocessing unit
112 Recognition processing unit
115 Storage device
313 Radar signal processing unit
133 Setting unit
134 Selection unit
311 Transmitter
312 Receiver
313 Radar signal processing unit
136 Prediction unit
401 Vehicle control system

The invention claimed is:

1. A recognition processing system comprising:
a first sensor device that acquires an image signal by imaging;
a second sensor device that performs an object detection process, a selection unit that selects one of a plurality of recognition processes based on information on the object detected by the detection process;
a recognition processing unit that executes the recognition process selected by the selection unit based on the image signal;
a preprocessing unit that performs preprocessing on the image signal; and
a setting unit that generates parameter information for the preprocessing based on the information on the object detected by the detection process, wherein the preprocessing unit performs the preprocessing on the image signal based on the parameter information, and the recognition processing unit executes the recognition process based on the preprocessed image signal;
wherein the parameter information includes a setting value of at least one of a scaling process and a color setting process performed on a signal extracted from an area to be extracted from the signal.

2. The recognition processing system according to claim 1, wherein the selection unit selects one of the plurality of recognition processes according to a type of the object detected in the detection process.

3. The recognition processing system according to claim 1, wherein the first sensor device performs the imaging in a first period, the second sensor device performs the detection process for at least a part of the first period, and the recognition processing unit performs the recognition process in a third period after the lapse of the first period.

4. The recognition processing system according to claim 3, wherein the first sensor device includes an imaging element and acquires the image signal by exposing the imaging element to light during the first period.

5. The recognition processing system according to claim 1, wherein the recognition processing unit includes a plurality of recognizers that perform the plurality of recognition processes, the selection unit selects one of the plurality of recognizers, and the recognition processing unit executes the recognition process using the selected recognizer.

6. The recognition processing system according to claim 1, wherein the selection unit selects one of a plurality of recognition programs for executing the plurality of recognition processes, and the recognition processing unit executes the recognition process by executing the selected recognition program.

7. The recognition processing system according to claim 1, wherein the information on the object includes at least one of a position and a type of the object.

8. The recognition processing system according to claim 7, wherein the parameter information includes information for specifying an the area to be extracted from the image signal.

9. The recognition processing system according to claim 1, further comprising: a prediction unit that predicts a position of the object in a next imaging period of the first sensor device based on the information on the object, wherein the setting unit generates the parameter information based on the predicted position of the object, and the recognition processing unit executes the recognition process based on an image signal acquired by the imaging or an image signal acquired by the next imaging.

10. The recognition processing system according to claim 1, wherein the first sensor device and the second sensor device operate in synchronization with a synchronization signal.

11. The recognition processing system according to claim 1, wherein the second sensor device is a sensor device of a different type from the first sensor device.

12. The recognition processing system according to claim 11, wherein the first sensor device is a camera, and the second sensor device is a radar.

13. A recognition processing device comprising:
a recognition processing unit that acquires an image signal obtained by imaging from a first sensor device, and executes one of a plurality of recognition processes based on the image signal;
a selection unit that acquires a result of an object detection process from a second sensor device and selects the one recognition process to be executed by the recognition processing unit from the plurality of recognition processes based on information on the detected object;
a preprocessing unit that performs preprocessing on the image signal; and
a setting unit that generates parameter information for the preprocessing based on the information on the object detected by the detection process, wherein the preprocessing unit performs the preprocessing on the image signal based on the parameter information, and the recognition processing unit executes a recognition process based on the preprocessed image signal;
wherein the parameter information includes a setting value of at least one of a scaling process and a color setting process performed on a signal extracted from an area to be extracted from the signal.

14. A recognition processing method comprising:

acquiring an image signal by imaging;

preprocessing the image signal based on parameter information;

performing an object detection process;

selecting one of a plurality of recognition processes based on information on the object detected by the detection process;

generating the parameter information for the preprocessing based on the information on the object, the parameter information includes a setting value of at least one of a scaling process and a color setting process performed on a signal extracted from an area to be extracted from the signal; and executing the selected recognition processing based on the image signal.

* * * * *